(12) United States Patent
Yamauchi

(10) Patent No.: US 9,077,875 B2
(45) Date of Patent: Jul. 7, 2015

(54) IMAGE CAPTURING DEVICE

(71) Applicant: PANASONIC CORPORATION, Osaka (JP)

(72) Inventor: Hideaki Yamauchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/212,108

(22) Filed: Mar. 14, 2014

(65) Prior Publication Data
US 2014/0285700 A1    Sep. 25, 2014

(30) Foreign Application Priority Data

Mar. 22, 2013  (JP) .................. 2013-059523

(51) Int. Cl.
H04N 5/225    (2006.01)
G03B 17/02   (2006.01)

(52) U.S. Cl.
CPC .............. *H04N 5/2251* (2013.01); *G03B 17/02* (2013.01)

(58) Field of Classification Search
CPC . H04N 5/2251; H04N 5/2252; H04N 5/2256; G03B 15/03; G03B 15/05; G03B 17/02; G03B 17/04
See application file for complete search history.

(56) References Cited

U.S. PATENT DOCUMENTS

| 2004/0169955 A1* | 9/2004 | Tsuchida | 360/96.5 |
| 2005/0157165 A1* | 7/2005 | Idera | 348/14.16 |
| 2006/0222357 A1* | 10/2006 | Tomimoto | 396/177 |
| 2007/0177863 A1* | 8/2007 | Ishikawa et al. | 396/177 |
| 2008/0273108 A1* | 11/2008 | Tsutsumi | 348/333.01 |
| 2012/0176535 A1* | 7/2012 | Takeda | 348/375 |
| 2012/0224716 A1* | 9/2012 | Ohtsuka | 381/92 |
| 2012/0328358 A1* | 12/2012 | Akiyama | 403/111 |

FOREIGN PATENT DOCUMENTS

JP    08-182091 A    7/1996

* cited by examiner

*Primary Examiner* — Timothy J Henn
(74) *Attorney, Agent, or Firm* — McDermott Will & Emery LLP

(57) ABSTRACT

There are included a housing, an image capturing unit provided to the housing, for capturing a subject image formed through an optical system, a sound pickup unit provided to the housing, for picking up audio, and a movable unit capable of moving at least between a first position and a second position with respect to the housing, the movable unit including a light emitter for emitting light on a subject, and a plate-shaped plate portion, the movable unit being for forming a space between the light emitter and the plate portion, and in a case where the movable unit is at the first position, the sound pickup unit is disposed in the space, and in a case where the movable unit is at the second position, the plate portion is disposed at a position facing the sound pickup unit.

4 Claims, 5 Drawing Sheets

IMAGE CAPTURING DEVICE

RELATED APPLICATIONS

This application claims the benefit of Japanese Application No. 2013-059523, filed on Mar. 22, 2013, the disclosure of which is incorporated by reference herein.

BACKGROUND OF THE INVENTION

1. Field of the Invention

The present disclosure relates to an image capturing device capable of picking up audio, and of recording audio data.

2. Description of the Related Art

These days, image capturing devices capable of recording audio data are becoming widespread. With respect to such an image capturing device including an audio recording function, there is known a technique for realizing a function of adjusting the directivity of a microphone based on information indicating the focal length of a lens, and thereby changing the range of sound pickup (for example, see Unexamined Japanese Patent Publication No. H8-182091).

SUMMARY OF THE INVENTION

The present disclosure provides an image capturing device that is capable of effectively picking up audio even with respect to audio emitted from a far away sound source.

An image capturing device of the present disclosure includes a housing, an image capturing unit provided to the housing, for capturing a subject image formed through an optical system, a sound pickup unit provided to the housing, for picking up audio, and a movable unit capable of moving at least between a first position and a second position with respect to the housing, the movable unit including a light emitter for emitting light on a subject, and a plate-shaped plate portion, the movable unit being for forming a space between the light emitter and the plate portion, and in a case where the movable unit is at the first position, the sound pickup unit is disposed in the space, and in a case where the movable unit is at the second position, the plate portion is disposed at a position facing the sound pickup unit.

According to the present disclosure, an image capturing device that is capable of effectively picking up audio even with respect to audio emitted from a far away sound source may be provided.

DETAILED DESCRIPTION OF THE PREFERRED EMBODIMENTS

Figure 1:
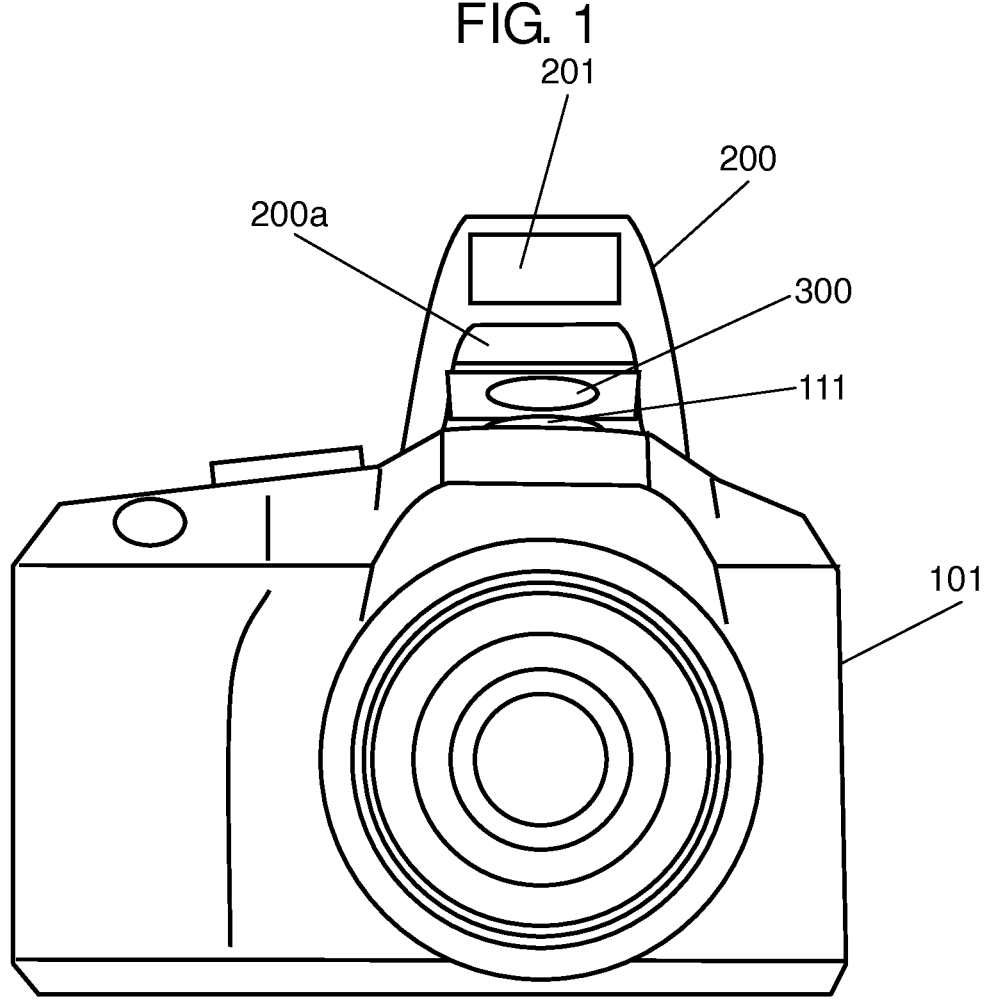
FIG. 1 is a front view showing a digital camera according to a first exemplary embodiment.
Figure 1:

Hereinafter, an exemplary embodiment will be described in detail while referring to the drawings as appropriate. Additionally, an overly detailed description may be omitted. For example, a detailed description of matters that are already well known, or a redundant description about substantially same structures may be omitted. This is to prevent the following description from becoming unnecessarily redundant, and to facilitate understanding for those skilled in the art.

Additionally, the inventor(s) provide(s) the appended drawings and the following description to enable those skilled in the art to sufficiently understand the present disclosure, and do(es) not intend to restrict the subject matters described in the claims by the drawings and the description.

[First Exemplary Embodiment]

Hereinafter, a first exemplary embodiment will be described with reference to the drawings. In the following description of the drawings, portions that are the same or similar will be given the same or similar reference numerals. Additionally, the drawings are merely schematics, and the actual dimensional proportions and so forth may differ from reality. Therefore, the specific dimensions and so forth should be determined by reference to the following description. It is also needless to say that the drawings may include portions in which dimensional interrelations and proportions vary from one drawing to another.

Additionally, in the following exemplary embodiment, a digital camera will be described as an example of an image capturing device which is an electronic device including a sound pickup device. In the following description, based on the normal attitude (hereinafter, referred to also as a horizontal shooting attitude) of the image capturing device, the direction toward a subject will be expressed as "front", the opposite direction from the subject as "back", the vertical upward as "upward", the vertical downward as "downward", the right direction in the state of facing the subject as "right", and the left direction in the state of facing the subject as "left".

Digital camera 100 of the first exemplary embodiment includes microphone unit 111. Digital camera 100 picks up the ambient sound by microphone unit 111 at the time of shooting a moving image. Digital camera 100 thereby performs audio recording together with image recording. In the following, the configuration and operation of digital camera 100 will be described.

[1. Configuration]

[1-1. Configuration of Digital Camera 100]

Figure 2:
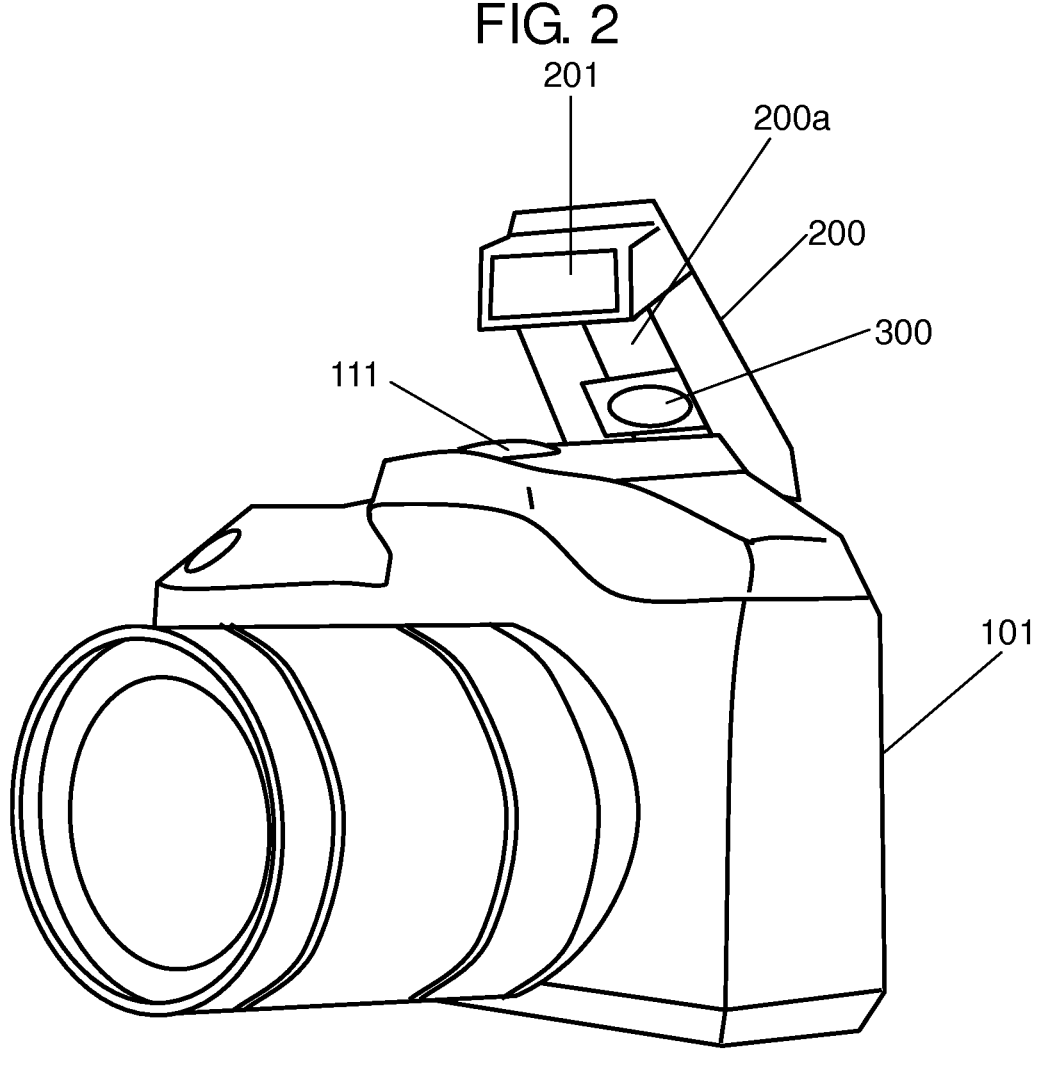
FIG. 2 is a perspective view showing the digital camera according to the first exemplary embodiment.
Figure 3A:
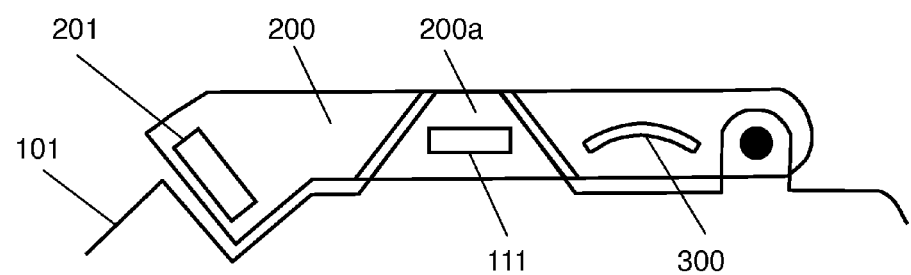
FIG. 3A is a schematic view for describing digital camera 100 with closed flash lamp unit 200.
Figure 3B:
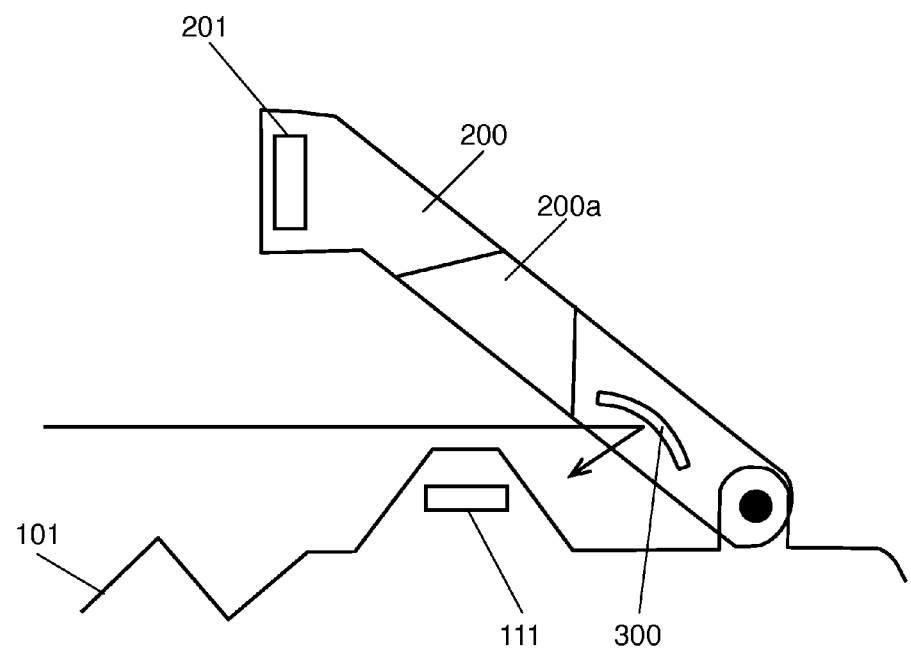
FIG. 3B is a schematic view for describing digital camera 100 with open flash lamp unit 200.

In the following, a configuration of digital camera 100 will be described with reference to FIGS. 1 to 4. FIG. 1 is a front view showing digital camera 100 according to the present exemplary embodiment. FIG. 2 is a perspective view showing digital camera 100 according to the present exemplary embodiment. FIG. 3A is a schematic view for describing digital camera 100 with closed flash lamp unit 200. FIG. 3B is a schematic view for describing digital camera 100 with open flash lamp unit 200.

As shown in FIGS. 1 and 2, digital camera 100 includes main body 101, flash lamp unit 200, and microphone unit 111. Flash lamp unit 200 is attached to main body 101 in a manner capable of opening and closing. Specifically, flash lamp unit 200 is movably attached to main body 101 by having a protrusion, not shown, provided to flash lamp unit 200 fitted into a hole, not shown, provided to main body 101. Flash lamp unit 200 may transition between a first state as shown in FIG. 3A, which is a closed state, and a second state, which is an open state. Moreover, flash lamp unit 200 includes xenon flash tube 201, and reflector 300. Xenon flash tube 201 may emit light on a subject. Reflector 300 is plate-shaped. Also, with respect to flash lamp unit 200, microphone opening 200a is formed between xenon flash tube 201 and reflector 300.

As shown in FIG. 3A, in the state where flash lamp unit 200 is closed, microphone unit 111 is positioned inside microphone opening 200a. As a result, in the state where flash lamp unit 200 is closed, microphone unit 111 is exposed to the outside. Thus, digital camera 100 may have ambient sound directly enter microphone unit 111 even in a state where flash lamp unit 200 is closed.

As shown in FIG. 3B, in the state where flash lamp unit 200 is open, reflector 300 reflects sound entering from the front, toward microphone unit 111. Accordingly, digital camera 100 may effectively pick up both the ambient sound directly entering microphone unit 111, and the ambient sound entering microphone unit 111 via reflector 300.

Figure 4:
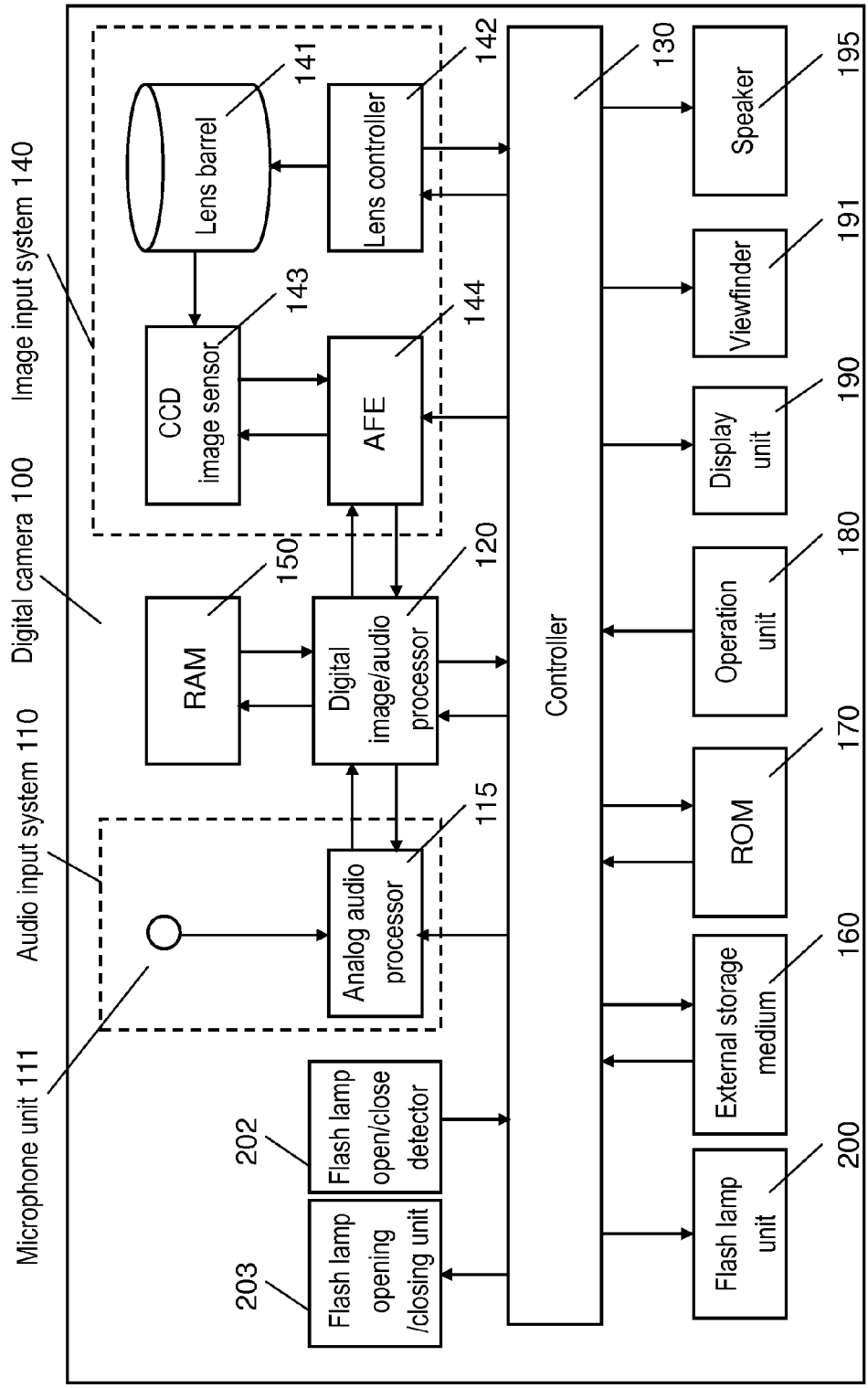
FIG. 4 is a block diagram showing an electrical configuration of the digital camera according to the first exemplary embodiment.

FIG. 4 is a block diagram showing an electrical configuration of digital camera 100. Digital camera 100 includes image input system 140, audio input system 110, digital image/audio processor 120, controller 130, RAM 150, flash lamp unit 200, flash lamp open/close detector 202, flash lamp opening/closing unit 203, external storage medium 160, ROM 170, operation unit 180, display unit 190, viewfinder 191, and speaker 195.

Digital camera 100 generates image information and audio signals based on information obtained from the outside. The image information is generated by image input system 140. The audio signal is generated by audio input system 110. The image information and the audio signal generated here are A/D converted and processed by digital image/audio processor 120, and then, recorded in external storage medium 160 such as a memory card. In the case a predetermined operation is received from a user through operation unit 180, the image information recorded in external storage medium 160 is displayed as an image on display unit 190 and/or viewfinder 191. In the case a predetermined operation is received from a user through operation unit 180, the audio signal recorded in external storage medium 160 is output from speaker 195 as audio.

In the following, details of each unit shown in FIGS. 1 to 4 will be given.

Image input system 140 includes lens barrel 141, lens controller 142, CCD image sensor 143, and AFE (analog front end) 144.

Lens barrel 141 is an optical system including a plurality of lenses. Lens barrel 141 forms a subject image by performing, by a motor that is driven according to a control signal transmitted from lens controller 142, focus adjustment for a subject, adjustment of the angle of view, adjustment of the amount of incident light, image stabilization, and the like.

CCD image sensor 143 captures the subject image formed through lens barrel 141, and generates the image information. Additionally, CCD image sensor 143 may generate image information of a new frame every specific period of time, when digital camera 100 is in a shooting mode.

At AFE 144, noise reduction by correlated double sampling, amplification to an input range of an A/D converter by an analog gain controller, and A/D conversion by an A/D converter are performed on the image information read from CCD image sensor 143. Then, AFE 144 outputs the image information to digital image/audio processor 120.

Flash lamp open/close detector 202 detects whether flash lamp unit 200 is open or closed, and outputs the detection result to controller 130. Detection of open/closed state is realized by providing a switch that is turned on when pressed by flash lamp unit 200 when flash lamp unit 200 is closed, and that is turned off when flash lamp unit 200 is opened, and by outputting on/off of the switch to controller 130.

Flash lamp opening/closing unit 203 performs opening/closing operation of flash lamp unit 200. For example, when a user operates operation unit 180 to issue an instruction regarding start of moving image shooting, a control signal is input from operation unit 180 to controller 130, and controller 130 controls flash lamp opening/closing unit 203 and opens flash lamp unit 200 according to the detection result. In the same manner, when the shooting is over, a control signal is input from operation unit 180 to controller 130, and controller 130 controls flash lamp opening/closing unit 203 and closes flash lamp unit 200 according to the detection result.

Audio input system 110 includes microphone unit 111, and analog audio processor 115. Microphone unit 111 is disposed on the upper surface of main body 101. Microphone unit 111 converts audio into an electrical signal by each microphone, and outputs the electrical signal after conversion as an audio signal. The audio signal which is output is input to analog audio processor 115. Analog audio processor 115 A/D-converts the processed audio signal by the A/D converter, and outputs the signal to digital image/audio processor 120.

Digital image/audio processor 120 performs various processes on the image information output from AFE 144, and the audio signal output from analog audio processor 115. For example, digital image/audio processor 120 performs gamma correction, white balance correction, flaw correction, encoding process, and the like on the image information, according to instructions from controller 130. Also, digital image/audio processor 120 performs various processes on the audio signal, according to instructions from controller 130. Digital image/audio processor 120 may be realized by a hard-wired electronic circuit, a microcomputer that executes programs, or the like. Also, digital image/audio processor 120 may be realized as one semiconductor chip that is integrated with controller 130 and the like. Microphone unit 111 may be realized by a single microphone, or by a plurality of microphones.

Display unit 190 is disposed on the rear surface of digital camera 100. In the present exemplary embodiment, display unit 190 is a liquid crystal display. Display unit 190 displays an image corresponding to the image information processed by digital image/audio processor 120. Images to be displayed by display unit 190 include through images, reproduction images, and the like. The through images are images of frames that are newly and sequentially generated by CCD image sensor 143 every specific period of time. Normally, digital image/audio processor 120 generates the through images from the image information generated by CCD image sensor 143, when digital camera 100 is set to the shooting mode, and is in a wait state where still image shooting is not performed or is in a moving image shooting state. A user may shoot a subject while checking the composition of the subject by referring to the through images displayed on display unit 190.

The reproduction images are generated by digital image/audio processor 120 when digital camera 100 is in a reproduction mode. The reproduction image is an image obtained by reducing a recorded high-resolution image that is recorded in external storage medium 160 or the like to a low-resolution image according to the size of display unit 190. High-resolution image information to be recorded in external storage medium 160 is generated by digital image/audio processor 120 based on the image information generated by CCD image sensor 143, after a predetermined operation by a user is received by operation unit 180. Speaker 195 outputs audio signals included in moving image data recorded in external storage medium 160, and audio signals indicating operational sound recorded in ROM 170. Digital camera 100 is also capable of displaying an image to be displayed by display unit 190 on viewfinder 191.

Controller 130 controls the operation of entire digital camera 100 in an integrated manner.

ROM 170 stores programs to be executed by controller 130 such as programs related to auto focus control, auto exposure control, light emission control of flash lamp unit 200, and the like, and programs for controlling entire digital camera 100 in an integrated manner, and the like.

Also, ROM 170 stores various conditions and settings related to digital camera 100. For example, ROM 170 stores a detection result of the flash lamp open/close detector, that is, a result of detection of a closed state or an open state of the flash lamp. Additionally, in the present exemplary embodiment, ROM 170 is a flash ROM.

Controller 130 may be realized by a hard-wired electronic circuit, a microcomputer that executes programs, or the like. Also, controller 130 may be realized as one semiconductor chip by being integrated with digital image/audio processor 120 and the like. Furthermore, ROM 170 does not have to exist outside controller 130, separately from controller 130, and may be embedded inside controller 130.

RAM 150 functions as a working memory of digital image/audio processor 120 and controller 130. RAM 150 may be realized by an SDRAM, a flash memory, or the like. RAM 150 also functions as an internal memory for recording the image information, the audio signal, and the like. Moreover, the detection result of the flash lamp open/close detector may also be stored in RAM 150.

External storage medium 160 is an external memory including, on the inside, a non-volatile recording unit such as flash memory. External storage medium 160 is capable of recording data such as the image information and the audio signal to be processed by digital image/audio processor 120.

Operation unit 180 is a collective term for operation interfaces such as operation buttons, an operation dial and the like disposed on the exterior of digital camera 100. Operation unit 180 includes a release button, a zoom lever, and the like. Operation unit 180 receives operations by a user. When operations by a user are received, operation unit 180 transmits signals to controller 130 to instruct controller 130 to perform various operations.

As shown in FIGS. 1 and 2, flash lamp unit 200 includes xenon flash tube 201, and reflector 300. Also, microphone opening 200a is formed between xenon flash tube 201 and reflector 300. Flash lamp unit 200 is capable of transitioning between a closed state where flash lamp unit 200 is in an accommodation position, along main body 101 of digital camera 100, and an open state where flash lamp unit 200 is in a protrusion position, with xenon flash tube 201 protruding upward from digital camera 100. Flash lamp unit 200 is caused to transition between the closed state and the open state by flash lamp opening/closing unit 203. That is, flash lamp unit 200 may be opened or closed. Microphone opening 200a is formed in such a way as to be open in accordance with the shape of microphone unit 111. Microphone unit 111 is exposed to the outside by being positioned inside microphone opening 200a in a state where flash lamp unit 200 closed. Thus, even in the state where flash lamp unit 200 is closed, digital camera 100 may effectively pick up the ambient sound.

Furthermore, reflector 300 reflects the ambient sound of a shooting subject in front of digital camera toward microphone unit 111 in a state where flash lamp unit 200 is opened upward. Reflector 300 is disposed and configured in such a way as to be able to effectively collect, at microphone unit 111, the ambient sound of the shooting subject in the front. Reflector 300 is provided at a surface, of flash lamp unit 200, which is on the side of microphone unit 111 in a state where flash lamp unit 200 is open. Reflector 300 does not reflect the ambient sound toward microphone unit 111 in a state where flash lamp unit 200 is closed, but in a state where flash lamp unit 200 is open, reflector 300 reflects the ambient sound toward microphone unit 111. Reflector 300 includes a concave surface that is concave with respect to microphone unit 111 such that a greater amount of ambient sound may be reflected toward microphone unit 111 in a state where flash lamp unit 200 is open. This concave surface is preferably positioned and shaped in such a way that the focus of the concave surface is substantially the same as the position of microphone unit 111 in a state where flash lamp unit 200 is open. Also, this concave surface is preferably disposed in the direction according to which the direction of incidence of the ambient sound that is reflected toward microphone unit 111 is substantially the same as the direction of the optical axis of lens barrel 141 of digital camera 100. Digital camera 100 may thereby directly collect the ambient sound of a subject at microphone unit 111, and also, collect the ambient sound of a subject at microphone unit 111 via reflector 300.

Furthermore, as shown in FIGS. 1 and 2, flash lamp unit 200 includes xenon flash tube 201. Xenon flash tube 201 is driven by a capacitor, a booster circuit, and a light emission trigger circuit. The booster circuit applies a high voltage on the capacitor according to a control signal from controller 130. The light emission trigger circuit causes the capacitor to discharge the high voltage, in synchronization with shooting. Specifically, the light emission trigger circuit causes, according to a control signal from controller 130, the capacitor that is charged to discharge the high voltage, and causes the xenon gas inside xenon flash tube 201 to instantaneously produce light. Xenon flash tube 201 can emit light in a state where flash lamp unit 200 is open. Digital camera 100 may thereby shoot the subject on which light has been emitted. That is, digital camera 100 may supplement the brightness of a subject and shoot the subject by xenon flash tube 201 of flash lamp unit 200 instantaneously emitting light on the subject at the time of image capturing.

Additionally, light emission of xenon flash tube 201 of flash lamp unit 200 includes pre-flash and main flash. The pre-flash is light emission before shooting. With the pre-flash, the level of the amount of reflected light from the subject is measured based on the light emission of xenon flash tube 201, and the distance to the subject is determined based on the level of the amount of reflected light. Then, the amount of light emission of xenon flash tube 201 at the time of shooting is obtained according to the determination result. The main flash is performed in synchronization with the timing of shooting, with the amount of light emission determined by the pre-flash.

[1-2. Correspondence Relationship to Present Technology]

CCD image sensor 143 is an example of an image capturing unit. Main body 101 of digital camera 100 is an example of a housing. Flash lamp unit 200 is an example of a movable unit. Microphone unit 111 is an example of a sound pickup unit. Reflector 300 is an example of a plate portion. Xenon flash tube 201 is an example of a light emitter. Lens barrel 141 is an example of an optical system. Digital camera 100 is an example of an image capturing device.

[2. Operation]

Next, an operation of digital camera 100 according to the present exemplary embodiment in a moving image shooting mode will be described. Digital camera 100 displays a through image on display unit 190 in a wait state in the moving image shooting mode or in a moving image shooting state where a moving image is being shot. In the following, the flow of an operation of audio recording in the moving image shooting mode will be described with reference to FIG.

Figure 5:
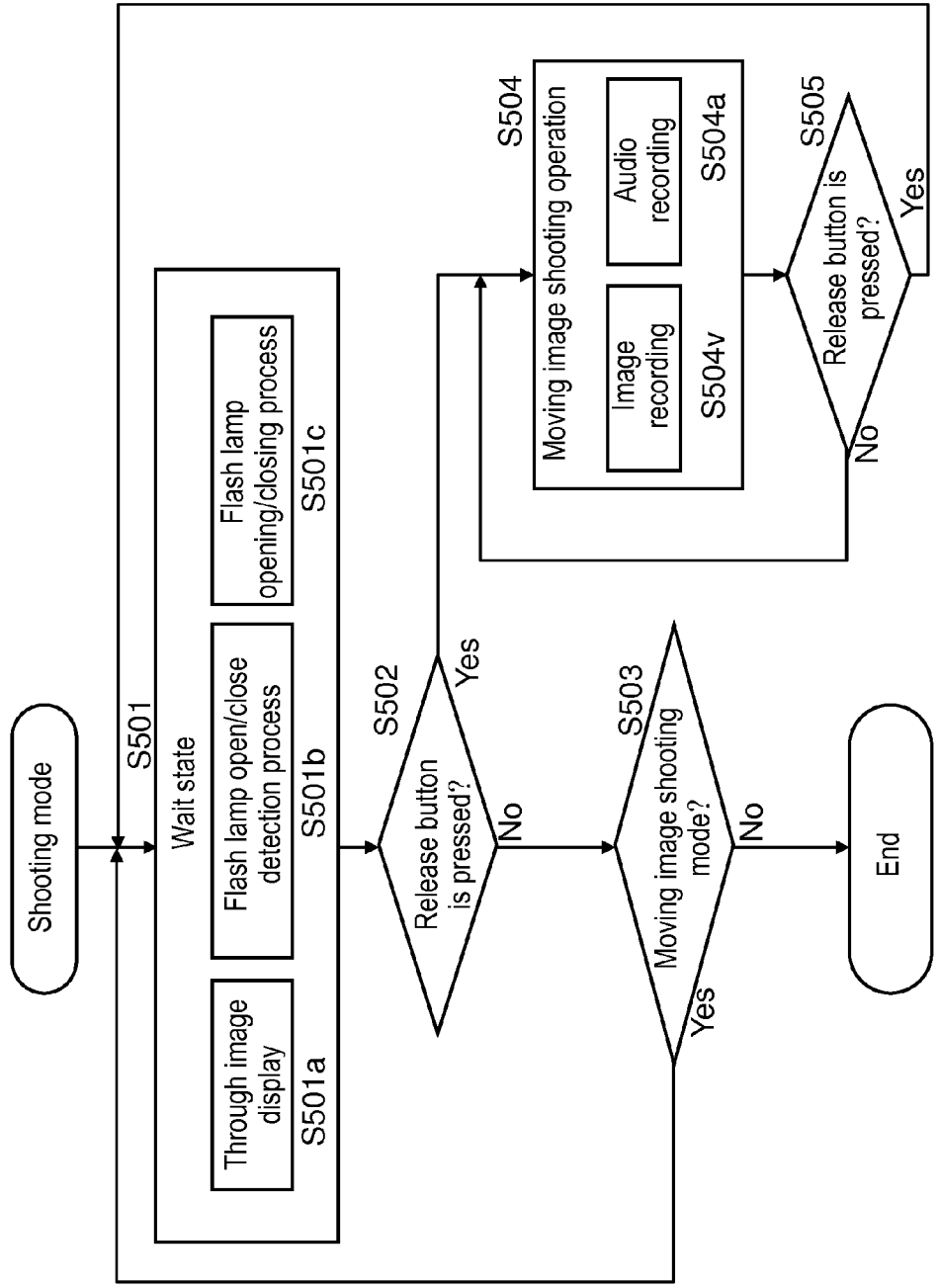
FIG. 5 is a flow chart showing the flow of an operation in a moving image shooting mode of the digital camera according to the first exemplary embodiment.

5. FIG. 5 is a flow chart showing the flow of an operation in the moving image shooting mode of digital camera 100.

When a user operates operation unit 180 and sets digital camera 100 in the moving image shooting mode, digital camera 100 transitions, in step S501, to a wait state in the moving image shooting mode. The wait state in step S501 includes a through image display process in step S501a, a flash lamp open/close detection process in step S501b, and a flash lamp opening/closing process in step S501c. In step S501a, controller 130 displays, on display unit 190, a through image input from digital image/audio processor 120. In step S501b, flash lamp open/close detector 202 detects whether flash lamp unit 200 is closed or open, and outputs the detection result to controller 130. If flash lamp unit 200 is detected to be closed in flash lamp open/close detection process S501b, controller 130 controls flash lamp opening/closing unit 203 in flash lamp opening/closing process S501c to open flash lamp unit 200. Then, flash lamp unit 200 automatically transitions from a closed state to an open state. Next, in step S502, controller 130 determines whether a release button is pressed or not.

If controller 130 determines in step S502 that the release button is pressed (Yes in S502), a moving image shooting operation is performed in step S504. The moving image shooting operation in step S504 includes an image recording operation in step S504v, and an audio recording operation in step S504a. In the moving image shooting operation in step S504, a recording process for the image information and the audio signal for one frame period is performed. Additionally, one frame period is the inverse of the frame rate at the time of the moving image shooting. For example, if the frame rate is 60 frames per second, one frame period is 1/60 seconds.

Furthermore, in the audio recording operation in step S504a, microphone unit 111 picks up the ambient sound received directly from the surrounding of a subject, and also, picks up the ambient sound reflected by reflector 300. Then, microphone unit 111 generates an audio signal based on the ambient sound which has been picked up, and outputs the signal. This audio signal is input to, and processed by, analog audio processor 115, and is further output to digital image/audio processor 120 at the later stage. For example, when a user operates the zoom lever of operation unit 180 at the time of moving image shooting, controller 130 controls lens controller 142 according to this operation, and changes the zoom position of lens barrel 141. The scaling factor of a subject image to be formed at CCD image sensor 143 is thereby changed. Moreover, by performing gain control on the audio signal from microphone unit 111 by analog audio processor 115 based on the information about the zoom position at this time or the operation of the zoom lever, more distant sound may be captured, and recorded, as a greater audio signal. Also, reflection of the ambient sound by reflector 300 allows recording of clear distant sound with less noise, compared to the audio processing of the past that is based only on the increase in the gain of the audio signal.

Subsequently, in step S505, controller 130 determines whether the release button is pressed or not. If it is determined in step S505 that the release button is not pressed (No in S505), controller 130 performs the moving image shooting operation for the next one frame in step S504. Also, in the case it is determined that the release button is pressed (Yes in S505), controller 130 ends the moving image shooting operation, and manages the wait state in step S501. In this manner, in the moving image shooting mode, digital camera 100 performs the moving image shooting operation from pressing of the release button to the next pressing of the release button.

On the other hand, in the case it is determined in step S502 that the release button is not pressed (No in S502), controller 130 performs determination regarding the shooting mode in step S503. In step S503, controller 130 determines whether or not the current operation mode is the moving image shooting mode. In the case the operation mode is determined to be the moving image shooting mode in step S503 (Yes in S503), controller 130 again performs step S501, which is the starting point of the operation in the moving image shooting mode. If the operation mode is determined to be not the moving image shooting mode in step S503 (No in S503), controller 130 ends the operation in the moving image shooting mode, and flash lamp unit 200 is driven by flash lamp opening/closing unit 203 to close. Then, flash lamp unit 200 automatically transitions from the open state to the closed state.

[3. Effect and the Like]

As described, digital camera 100 of the present exemplary embodiment includes main body 101, CCD image sensor 143, microphone unit 111, and flash lamp unit 200. CCD image sensor 143 is provided to main body 101, and captures the subject image formed through lens barrel 141. Microphone unit 111 is provided to main body 101, and picks up the ambient sound. Flash lamp unit 200 is movable at least between a first position and a second position, with respect to main body 101. Also, flash lamp unit 200 includes xenon flash tube 201, and reflector 300. Xenon flash tube 201 emits light on a subject. Reflector 300 is plate-shaped. Flash lamp unit 200 forms microphone opening 200a between xenon flash tube 201 and reflector 300. When flash lamp unit 200 is at the first position, microphone unit 111 is disposed in microphone opening 200a, and when flash lamp unit 200 is at the second position, reflector 300 is disposed at a position facing microphone unit 111.

Digital camera 100 may thereby effectively pick up ambient sound emitted from a far away sound source.

Also, with digital camera 100, in the case flash lamp unit 200 is at the second position, reflector 300 is disposed at a position allowing reflector 300 to reflect the ambient sound entering from the direction parallel to the optical axis of lens barrel 141 in the direction of microphone unit 111.

Digital camera 100 may thereby effectively collect the ambient sound reflected by reflector 300 at microphone unit 111.

Furthermore, with digital camera 100, in the case flash lamp unit 200 is at the second position, the shape of reflector 300 is concave whose focus position is substantially the same as the position of microphone unit 111.

Digital camera 100 may thereby effectively collect the ambient sound reflected by reflector 300 at microphone unit 111.

Moreover, digital camera 100 further includes controller 130. Controller 130 determines whether or not the moving image shooting mode for recording a moving image in a recording medium is set. In the case it is determined that the moving image shooting mode is set, if flash lamp unit 200 is at the first position, controller 130 controls flash lamp unit 200 to move to the second position.

The configuration of digital camera 100 may thereby be automatically changed such that the ambient sound is more easily picked up, when the moving image shooting mode is set.

[Other Exemplary Embodiments]

As described above, the first exemplary embodiment has been described as an example of the technology disclosed in the present application. However, the technology of the present disclosure is not limited to the above, and may be applied to exemplary embodiments including, as appropriate, changes, replacement, addition, omission and the like.

Accordingly, other exemplary embodiments will be described below.

In the first exemplary embodiment, flash lamp unit 200 including microphone unit 111 rotates within a predetermined range with respect to main body 101 of digital camera 100 so as to be in the state of being accommodated in the main body of digital camera 100 or in the state of protruding upward. However, it is sufficient if at least one of the states, of flash lamp unit 200, of the position and the direction with respect to main body 101 of digital camera 100 is variable. More specifically, the configuration may be such that at least one of the position and the direction of reflector 300 is changed by the movement or rotation of flash lamp unit 200 from the closed state such that sound from outside is reflected and guided to microphone unit 111.

Also, in the first exemplary embodiment, flash lamp unit 200 is configured to be driven by flash lamp opening/closing unit 203 to perform an opening/closing operation. However, flash lamp unit 200 may alternatively be configured to be manually opened or closed by the user.

Furthermore, in the first exemplary embodiment, digital camera 100 has been described as an example of the image capturing device. However, any electronic device is allowed as long as the electronic device includes substantially the same configuration for picking up the ambient sound. That is, a device that does not perform processing related to images, such as an electronic device such as a voice recorder, is also allowed. Moreover, the movable unit with respect to the main body is not restricted to flash lamp unit 200, and it is sufficient if a member for reflecting the ambient sound to microphone unit 111 provided to main body 101 is disposed at a member that is movable with respect to main body 101.

Furthermore, in the first exemplary embodiment, xenon flash tube 201 has been described as an example of the light emitter of flash lamp unit 200. However, structures other than the xenon flash tube, for example, an LED or the like, may also be used as the light emitter.

Moreover, in the first exemplary embodiment, digital image/audio processor 120 and controller 130 have been described to each include the functions and structures described above, but the functions and the structures may be partially included in the other.

Also, in the first exemplary embodiment, CCD image sensor 143 has been described as an example of the image capturing unit, but the present invention is not restricted to be such. That is, other image sensors, such as a MOS image sensor, may also be used.

Furthermore, in the first exemplary embodiment, reflector 300 is configured as a plate-shaped member having a concave portion near the center. However, this configuration is not necessarily restrictive. For example, a configuration according to which the entire member is formed into a concave portion may be adopted as the reflector.

Exemplary embodiments have been described as above to illustrate the technology of the present disclosure. The appended drawings and the detailed description are provided for this purpose.

Accordingly, the structural elements described in the appended drawings and the detailed description include not only the structural elements necessary to solve the problems, but, to illustrate the technology, may also include structural elements that are not necessarily needed to solve the problems. Description of these structural elements that are not necessarily needed in the appended drawings and the detailed description does not directly accept these structural elements that are not necessarily needed as necessary structural elements.

Moreover, the exemplary embodiments described above are for illustrating the technology of the present disclosure, and various changes, replacement, addition, omission, and the like are possible within the scope of the claims or the equivalent range.

According to the present disclosure, an image capturing device that is capable of effectively picking up even the ambient sound that is emitted from a far away sound source may be provided. Moreover, application to devices for recording audio data, such as digital cameras, movie cameras, mobile phones, and voice recorders, is allowed.

What is claimed is:

1. An image capturing device comprising:
    a housing;
    an image capturing unit provided to the housing, for capturing a subject image formed through an optical system;
    a sound pickup unit provided to the housing, for picking up audio; and
    a movable unit capable of moving at least between a first position and a second position with respect to the housing, the movable unit including a light emitter for emitting light on a subject, and a plate-shaped plate portion, the movable unit being for forming a space between the light emitter and the plate portion, in a case where the movable unit is at the first position, the sound pickup unit is disposed in the space, and in a case where the movable unit is at the second position, the plate portion is disposed at a position facing the sound pickup unit.

2. The image capturing device according to claim 1, wherein when the movable unit is disposed at the second position, the plate portion is disposed at a position for reflecting audio entering from a direction parallel to an optical axis of the optical system to a direction toward the sound pickup unit.

3. The image capturing device according to claim 1, wherein a shape of the plate portion is concave whose focus position is substantially same as a position of the sound pickup unit when the movable unit is at the second position.

4. The image capturing device according to claim 1 further comprising:
    a controller for determining whether or not a moving image shooting mode is set for recording a moving image in a recording medium,
    wherein when the controller determines the moving image shooting mode is set, the controller controls the movable unit to move to the second position in a case where the movable unit is at the first position when the moving image shooting mode is determined as being set.

* * * * *